US010574462B2

(12) United States Patent
Jerichow et al.

(10) Patent No.: US 10,574,462 B2
(45) Date of Patent: Feb. 25, 2020

(54) INTERFACES FOR PRIVACY MANAGEMENT AS SERVICE OR FUNCTION

(71) Applicant: Nokia Technologies Oy, Espoo (FI)

(72) Inventors: Anja Jerichow, Grafing (DE); Annett Seefeldt, Berlin (DE); Nagendra S. Bykampadi, Bangalore (IN); Suresh P. Nair, Whippany, NJ (US); Ulrich Wiehe, Bad Hersfeld (DE)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 15/729,205

(22) Filed: Oct. 10, 2017

(65) Prior Publication Data

US 2019/0036697 A1  Jan. 31, 2019

(30) Foreign Application Priority Data

Jul. 29, 2017  (IN) .............................. 201741027041

(51) Int. Cl.
*H04L 9/32* (2006.01)
*H04L 9/14* (2006.01)
(Continued)

(52) U.S. Cl.
CPC ............ *H04L 9/3226* (2013.01); *H04L 9/006* (2013.01); *H04L 9/0825* (2013.01);
(Continued)

(58) Field of Classification Search
CPC ............. H04L 2209/80; H04L 63/0428; H04L 9/0861; H04L 9/14; H04L 9/30; H04L 9/3242; H04L 9/3247
See application file for complete search history.

(56) References Cited

U.S. PATENT DOCUMENTS 6,373,949 B1 *  4/2002  Aura ...................... H04W 12/02
                                                                380/247
9,768,961 B2 *  9/2017  Holtmanns ......... H04L 63/0414
(Continued)

FOREIGN PATENT DOCUMENTS

WO  PCT/US2018/000969  11/2018

OTHER PUBLICATIONS

3GPP, "3rd Generation Partnership Project; Technical Specification Group Services and System Aspects; System Architecture for the 5G System; Stage 2 (Release 15)," 3GPP TS 23.501, V0.4.0, Apr. 2017, 124 pages.

(Continued)

*Primary Examiner* — Joseph P Hirl
*Assistant Examiner* — Sayed Aresh Beheshti Shirazi
(74) *Attorney, Agent, or Firm* — Ryan, Mason & Lewis, LLP

(57) ABSTRACT

Privacy management techniques for communication systems are provided. In one or more methods, one or more cryptographic key pairs are provisioned in a home network of a communication system for utilization by subscribers of the home network to conceal subscriber identifiers provided to access points in the communication system. The cryptographic key pairs are managed utilizing an element or function in the home network of the communication system. In one or more other methods, one or more public keys associated with one or more cryptographic key pairs are stored in user equipment, the cryptographic key pairs being provisioned by a home network of a communication system for use by subscribers of the home network to conceal subscriber identifiers provided to access points in the communication network. An element or function of the home network of the communication system is interfaced for management of the public keys stored in the user equipment.

20 Claims, 7 Drawing Sheets

(51) Int. Cl.
*H04L 9/30* (2006.01)
*H04L 9/08* (2006.01)
*H04L 29/06* (2006.01)
*H04W 12/04* (2009.01)
*H04W 12/02* (2009.01)
*H04L 9/00* (2006.01)
*H04W 88/02* (2009.01)
*H04W 12/00* (2009.01)

(52) U.S. Cl.
CPC .............. *H04L 9/0894* (2013.01); *H04L 9/14* (2013.01); *H04L 9/30* (2013.01); *H04L 63/0428* (2013.01); *H04L 63/062* (2013.01); *H04W 12/02* (2013.01); *H04W 12/04* (2013.01); *H04L 2209/42* (2013.01); *H04L 2209/80* (2013.01); *H04W 12/00514* (2019.01); *H04W 88/02* (2013.01)

(56) References Cited

U.S. PATENT DOCUMENTS

| | | | | |
|---|---|---|---|---|
| 2008/0130898 | A1* | 6/2008 | Holtmanns | H04L 63/0414 380/278 |
| 2009/0305671 | A1* | 12/2009 | Luft | G06Q 30/0205 455/411 |
| 2010/0017596 | A1* | 1/2010 | Schertzinger | G06F 21/33 713/155 |
| 2013/0080779 | A1* | 3/2013 | Holtmanns | H04L 63/0414 713/168 |
| 2013/0151845 | A1* | 6/2013 | Donovan | H04L 63/0407 713/153 |
| 2016/0065362 | A1* | 3/2016 | Choyi | H04L 63/065 380/279 |
| 2017/0149564 | A1* | 5/2017 | McCallum | G06F 21/6209 |
| 2017/0264439 | A1* | 9/2017 | Muhanna | H04W 12/02 |
| 2018/0013568 | A1* | 1/2018 | Muhanna | H04L 9/14 |
| 2018/0124597 | A1* | 5/2018 | Malthankar | H04L 9/3271 |

OTHER PUBLICATIONS

3GPP, "3rd Generation Partnership Project; Technical Specification Group Services and System Aspects; Study on the Security Aspects of the Next Generation System (Release 14)," 3GPP TR 33.899, V1.1.0, Mar. 2017, 491 pages.

3GPP, "3rd Generation Partnership Project; Technical Specification Group Services and System Aspects; Procedures for the 5G System; Stage 2 (Release 15)," 3GPP TS 23.502, V0.1.0, Jan. 2017, 44 pages.

3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 14)," 3GPP TS 29.272, V14.0.0, Jun. 2016, 153 pages.

3GPP, "3rd Generation Partnership Project; Technical Specification Group Services and System Aspects; Study on the Security Aspects of the Next Generation System; (Release 14)," 3GPP TR 33.899, V1.2.0, Jun. 2017, 586 pages.

* cited by examiner

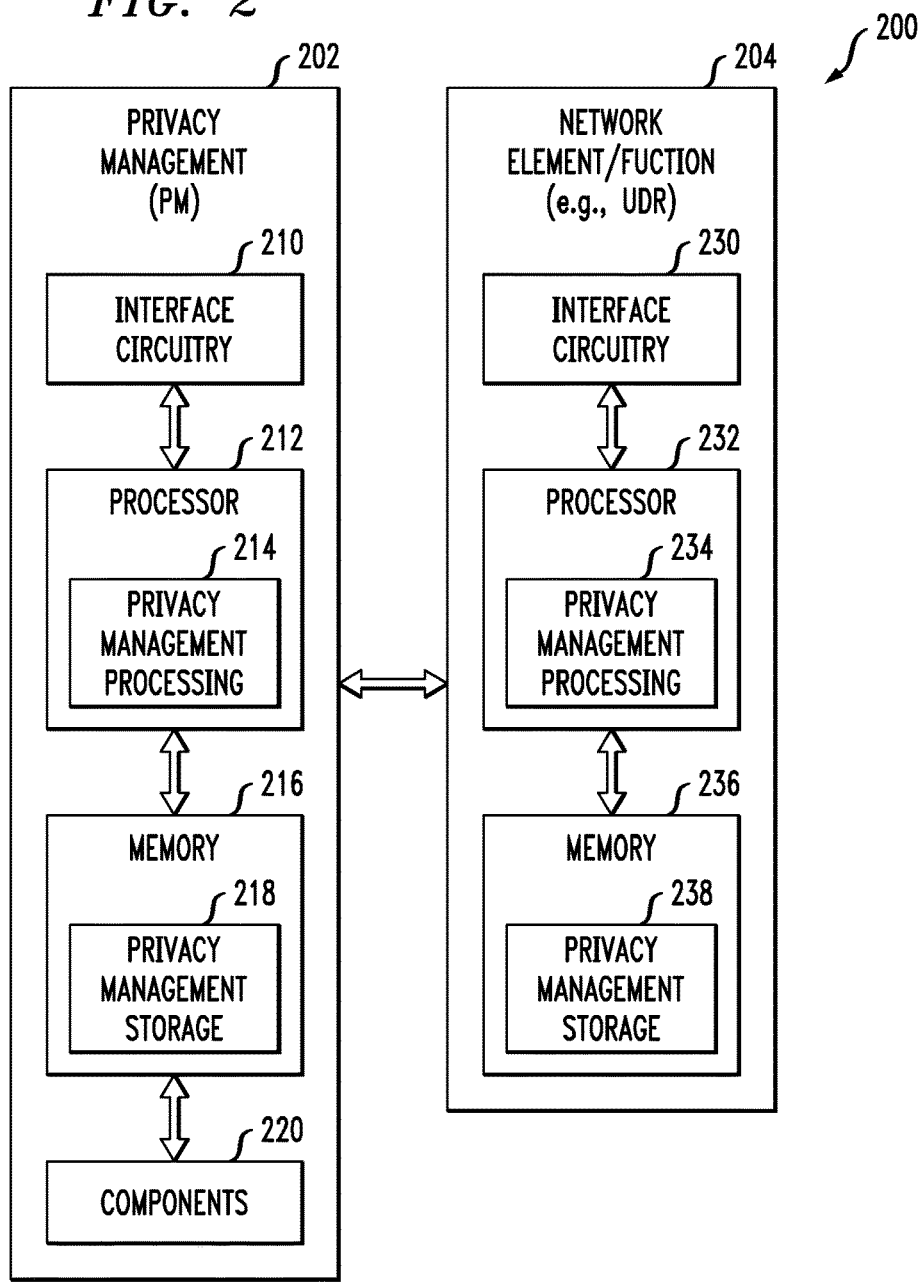
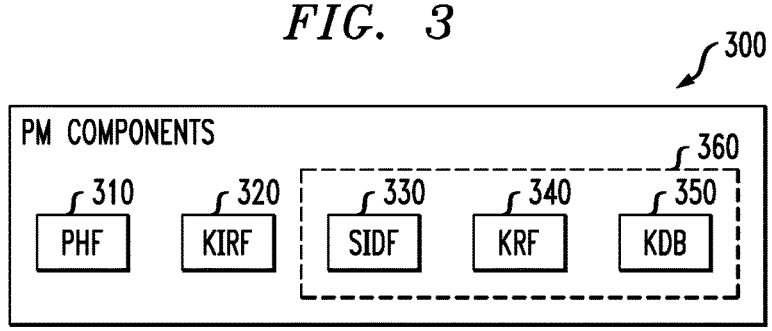

FIG. 8

| NF SERVICE NAME | DESCRIPTION | EXAMPLE CONSUMER |
|---|---|---|
| Nudm_UE CONTEXT MANAGEMENT | 1. PROVIDE THE NF CONSUMER OF THE INFORMATION RELATED TO UE's TRANSACTION INFORMATION, e.g. UE's SERVING NF IDENTITY, UE STATUS, etc.<br>2. ALLOW THE NF CONSUMER TO REGISTER, REMOVE ITS INFORMATION FOR THE SERVING UE IN THE UDM. | AMF, SMF, SMSF |
| Nudm_SUBSCRIBER DATA MANAGEMENT | 1. ALLOW NF CONSUMER TO RETRIEVE USER SUBSCRIPTION DATA WHEN NECESSARY.<br>2. PROVIDE UPDATED USER SUBSCRIBER DATA TO THE SUBSCRIBED NF CONSUMER. | AMF, SMF |
| Nudm_AUTHENTICATION | 1. PROVIDE UPDATED AUTHENTICATION RELATED SUBSCRIBER DATA TO THE SUBSCRIBED NF CONSUMER. | AUSF |
| Nudm_PRIVACY MANAGEMENT | 1. ACT AS ENTRANCE POINT FOR MANAGEMENT (PHF).<br>2. PROVIDE PRIVACY INFORMATION ABOUT A KEY IDENTIFIER FOR THE STORED PRIVATE/PUBLIC KEY PAIR (KIR).<br>3. REQUEST DECRYPTION KEY (KRF).<br>4. DECRYPT CONCEALED IDENTIFIER (SIDF). | AMF, AUSF |

| NF SERVICE | NF SERVICE OPERATIONS | OPERATION SCHEMATICS | KNOWN CONSUMER(S) |
|---|---|---|---|
| SUBSCRIBER DATA MANAGEMENT | GET | REQUEST/RESPONSE | AMF, SMF, SMSF |
|  | UPDATE NOTIFICATION | SUBSCRIBE/NOTIFY | AMF, SMF, SMSF |
| UE CONTEXT MANAGEMENT | REGISTRATION | REQUEST/RESPONSE | AMF, SMF, SMSF |
|  | DEREGISTRATION NOTIFICATION | SUBSCRIBE/NOTIFY | AMF, SMF, SMSF |
|  | DEREGISTRATION | REQUEST/RESPONSE | AMF, SMF, SMSF |
|  | GET | REQUEST/RESPONSE | NEF |
|  | UPDATE | REQUEST/RESPONSE | AMF |
| UE AUTHENTICATION | REQUEST | REQUEST/RESPONSE | AUSF |
| EVENT EXPOSURE | SUBSCRIPTION REQUEST/RESPONSE NOTIFICATION | SUBSCRIBE/NOTIFY REQUEST/RESPONSE | NEF |
| PRIVACY MANAGEMENT | RECONFIRM/REQUEST INFO ON PKid (KIR) KEY SELECTION/REQUEST DECRYPTION KEY (KRF) REQUEST DECRYPTION (SIDF) | | |

US 10,574,462 B2

INTERFACES FOR PRIVACY MANAGEMENT AS SERVICE OR FUNCTION

FIELD

The field relates generally to communication systems, and more particularly, but not exclusively, to privacy management techniques within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services intended to provide improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network or an eNB (evolved Node B) in an LTE network. The access point (e.g., gNB/eNB) is illustratively part of an access network of the communication system. For example, in a 5G network, the access network is referred to as a 5G System and is described in 5G Technical Specification (TS) 23.501, V0.4.0, entitled "Technical Specification Group Services and System Aspects; System Architecture for the 5G System," the disclosure of which is incorporated by reference herein in its entirety. In an LTE network, the access network is an Evolved Universal Terrestrial Radio Access Network (E-UTRAN). In general, the access point (e.g., gNB/eNB) provides access for the UE to a core network (CN), which then provides access for the UE to other UEs and/or a data network such as a packet data network (e.g., Internet).

Privacy is an important consideration in any communication system. Privacy is broadly addressed in 5G Technical Report (TR) 33.899, V1.1.0, entitled "3rd Generation Partnership Project; Technical Specification Group Services and System Aspects; Study on the security aspects of the next generation system (Release 14)," the disclosure of which is incorporated by reference herein in its entirety. In particular, TR 33.899 identifies subscription (UE) privacy as one of the most important security areas to be addressed in 5G networks.

SUMMARY

Illustrative embodiments provide techniques for providing subscriber privacy in communication systems.

In one or more methods according to illustrative embodiments, one or more cryptographic key pairs are provisioned in a home network of a communication system for utilization by subscribers of the home network to conceal subscriber identifiers provided to one or more access points in the communication system. The one or more cryptographic key pairs are managed utilizing an element or function in the home network of the communication system.

In one or more other methods according to illustrative embodiments, one or more public keys associated with one or more cryptographic key pairs are stored in user equipment, the cryptographic key pairs being provisioned by a home network of a communication system for use by subscribers of the home network to conceal subscriber identifiers provided to one or more access points in the communication network. An element or function of the home network of the communication system is interfaced for management of the one or more public keys stored in the user equipment.

Advantageously, illustrative embodiments enable network elements or functions to manage subscriber identifier privacy.

While these techniques can be applied to various communication networks, they are particularly suitable for 5G and next generation communication networks.

Further embodiments are provided in the form of non-transitory computer-readable storage medium having embodied therein executable program code that when executed by a processor causes the processor to perform the above steps. Still further embodiments comprise apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 2 is a block diagram of an overview of a system for providing privacy management in an illustrative embodiment.

FIG. 3 is a block diagram of components of a privacy manager in an illustrative embodiment.

FIG. 8 is a table of network function services provided by a function enhanced with privacy management as a service in an illustrative embodiment.

FIG. 9 is another table of network function services provided by a function enhanced with privacy management as a service in an illustrative embodiment.

DETAILED DESCRIPTION

Figure 1:
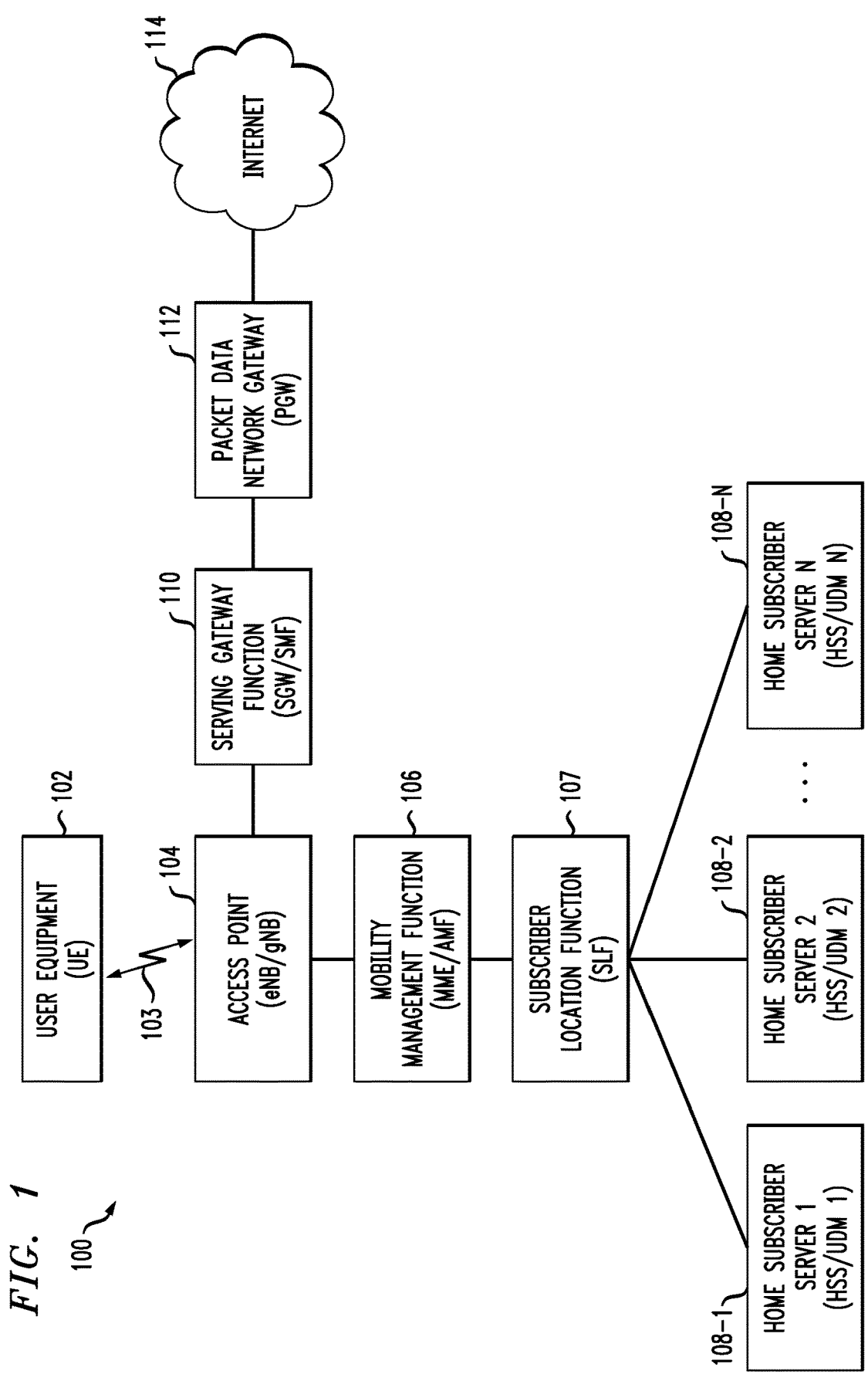
FIG. 1 is a block diagram of a communication system in an illustrative embodiment.

Embodiments will be illustrated herein in conjunction with example communication systems and associated techniques for providing privacy management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as an LTE Evolved Packet Core (EPC) and a 3GPP next generation system (5G), the disclosed embodiments can be adapted in a straightforward manner to a variety of other types of communication systems including, but not limited to, WiMAX systems and Wi-Fi systems.

As mentioned above, privacy of subscription identifiers when communicating over the air interface between the user equipment and the network access point has been a significant issue for 2G/3G/4G networks. Efforts have been made in 5G networks to address this significant issue.

For example, it is known that malicious actors attempt to learn subscriber identifiers either by passively (passive catcher) eavesdropping over the air interface between the UE and the gNB/eNB, or actively (active catcher) requesting the subscriber identifier.

Solutions to provide privacy over the air interface can be generally grouped in three solution classes:
(1) pseudonym solutions based on symmetric cryptographic systems, which demand a home subscriber server/function of the UE's home network to map a changing pseudonym to the permanent subscription identifier of the UE;
(2) encryption of the permanent subscription identifier of the UE using the public key of the home network operator; and
(3) encryption of the permanent subscription identifier of the UE using the public key of the serving network operator.

Note that, in one example, an International Mobile Subscriber Identity (IMSI) is a permanent subscription identifier (subscriber identity) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN).

Note also that in an LTE network, the home subscriber server/function is called a Home Subscriber Server (HSS), and in a 5G network it is called User Data Management (UDM) which may also comprise an Authentication and Security Function (AUSF) and an Authentication Credential Repository and Processing Function (ARPF) as part of the UDM function.

While illustrative embodiments are described herein from the perspective of the second solution class (i.e., the home network public key based solution), alternative embodiments may be implemented for one or more other solution classes. See 3GPP TS 23.502 and 3GPP TR 33.899, the disclosures of which are incorporated by reference herein in their entireties.

In the home network public key based solution, the home operator provides its public key to all home network subscribers. A network subscriber uses the public key of the home operator to encrypt its subscriber identity. In the case of an IMSI, the MSIN provides the subscriber identity. Only the MSIN portion of the IMSI needs to be encrypted. The MNC and MCC portions of the IMSI provide routing information, used by the serving network to route to the correct home network. The home HSS is the only entity that can decrypt the encrypted subscriber identity, as the home HSS possesses the private key that corresponds to the public key used by the network subscriber in encrypting the subscriber identity. Once the IMSI is identified, HSS/AuC (where AuC is the Authentication Center part of the HSS) will create authentication vectors (AVs) based on the distinct shared root key K between a user (subscriber) and the HSS/AuC. Similarly, in the 5G network, the UDM/ARPF creates the AVs requested via AUSF. AUSF and UDM could be co-located for optimization reasons.

An operator in a network may have implementations that utilize multiple HSSs, allowing the operator to manage distinct sets of users in different HSSs/UDMs. Because of the multiple HSSs, a Server Location Function (SLF) is implemented in front of a set of HSSs. The SLF analyses the authentication request for a user received from a Mobility Management Element (MME) (in an LTE network) or Access and Mobility Management Function (AMF) (in a 5G network) and routes it to the correct HSS.

By way of example only, operation of the SLF is described in 3GPP TS 29.272 (Section 8: "User identity to HSS resolution") entitled "3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 14)," the disclosure of which is incorporated by reference herein in its entirety. SLF provides user identity (IMSI)-to-HSS resolution using a locally maintained subscriber profile database and routes Diameter messages containing the user authentication requests, as a Diameter proxy to the chosen HSS. Note that, in 5G, similar functionality would also be requested if 5G core network protocols are different from Diameter, e.g., using http-proxies. In the following descriptions, it is assumed that the SLF is covering both the DRA (Diameter Routing Agent) based solution as per 4G or any other proxy related solution dependent on protocol decisions for the 5G core network.

It is realized herein that the 5G UE and the HSS/UDM of its home network (public land mobile network or PLMN) share a long-term identifier (e.g., subscriber permanent identifier or SUPI), such as IMSI, and a long-term key K. As mentioned above, a home PLMN has a public key, which it has made available to the UE. Since this is a relationship between the operator and its subscribers, this can be a raw public key, i.e., no need for certificates (global public key infrastructure (PM)).

Thus, in the home network (HN) centric long-term identifier (e.g., SUPI) privacy solution, the HN operator provides one public key used for encrypting the long-term identifier over the air to all of its subscribers. According to this solution:

(1) One (or more) public/private privacy key pairs (also referred to herein as key pairs or public/private key pairs) are dedicated for privacy. More key pairs may be created and stored to allow for seamless key update(s) (which may require key identification).

(2) The private privacy key (also referred to herein as a private key) is not permitted to leave the HN environment.

(3) The HN public privacy key (also referred to herein as a public key) has to be made available to the UE in advance. The HN public privacy key could be a raw public key (i.e., no need for certificates). The home PLMN can pre-provision the public key in the UE or use an OTA (over-the-air) mechanism to distribute it if the public key is stored on the Universal Subscriber Identity Module (USIM) of the UE. USIMs that do not allow creation of new fields may be used in 5G.

(4) All subscribers of the HN are supposed to use the same HN public privacy key for encryption.

(5) Every time the 5G UE is required to send its long-term identifier, the 5G UE encrypts the parts of the long-term identifier not needed for routing purposes (i.e., the MSIN) with the public key of the home PLMN and sends the encrypted long-term identifier to the serving or home PLMN. Long-term identifiers are needed for initial attach, if the serving network (SN) does not have a temporary identity available. Other reasons for sending long-term identifiers could be possible, such as Packet Data Network (PDN) connection establishment and handover scenarios.

(6) An encrypted long-term identifier is provided to the SN and routed to the HN for decryption. The encrypted form of the long-term identifier may be referred to as a concealed identifier.

3GPP SA3 has decided to deploy SUPI/IMSI privacy from 5G onwards. However, there have been further discussions about whether this solution could be used in 4G.

Whenever the UE is asked to provide its identity, it sends the encrypted identity and the HSS/UDM will retrieve the real identity. It is assumed that the HSS/UDM has a secure execution environment to decrypt any received request.

In a simple implementation, HSS/UDM could try to decrypt the encrypted identity with one private key; if not successful, HSS/UDM would just use another private key to decrypt the encrypted identity, and so on. However, this is not an efficient solution. As such, illustrative embodiments provide an indication of which key pair is in use by the introduction of a key pair indicator, e.g., flag, field, identifier, or some other identification. More particularly, a key pair indicator is uniquely assigned to a given public/private privacy key pair. Then, a given key pair indicator is advantageously used by the UE to indicate which public key was used to encrypt its permanent identifier, and by the HSS/UDM or other network element/function as will be explained to efficiently decide which private key will be selected/used for decryption.

In one illustrative key provisioning embodiment, one or more cryptographic public/private key pairs are generated as follows:

(1) Generation of one or more public/private key pairs together with a unique key pair indicator (e.g., indication/flag/field/identifier) for each of the one or more public/private key pairs is performed in a trusted platform, e.g., TTP.

(2) A private key together with the key pair indicator of the public/private key pair is stored in a secure environment, e.g., a high security module (HSM).

(3) HSS/UDM is provided with the key pair indicator of the public/private key pair in use.

(4) UEs are provided with the public key and the key pair indicator of the public/private key pair in use. UE (Universal Integrated Circuit Card or UICC) stores the key pair indicator with the public key.

In one illustrative authentication embodiment, a usage methodology for the provisioned key pair and key pair indicator may comprise:

(1) UE adds, in each message that includes the encrypted identity of the UE, the key pair indicator of the public key used to generate the encrypted identity (e.g., IMSI or part thereof).

(2) HSS/UDM sends the key pair indicator together with the encrypted identity to the secure environment (HSM) for execution.

(3) The secure environment (HSM) can act very quickly and thereby efficiently analyse the received key pair indicator and provide the decrypted identifier (e.g. IMSI or part thereof) back to the HSS/UDM, which then proceeds with generation and provisioning of authentication vectors (AVs) in a conventional manner.

It is to be appreciated that, in alternative embodiments, instead of the HSS/UDM performing the above-enumerated steps/functions, the steps/functions can be performed by the SLF completely, or some combination of sharing the steps/functions can be implemented between the HSS/UDM and SLF. Still further, other network elements/functions (other than HSS/UDM or SLF) can be configured to perform the above-enumerated and other steps. Alternatively, rather than a separate HSM, message decryption itself can be performed in the HSS/UDM or SLF if a secure execution environment is available therein.

While no more than two public/private key pairs are typically needed (one current, and one for future), embodiments are not intended to be limited to two key pairs (e.g., operator-specific implementations with more than two key pairs are contemplated). The initial provisioning of the UICC (or Mobile Equipment (ME)) would benefit if two public keys (including the key pair indicator) are stored. Since the home network (HN) operator replaces one public key by another public key (including the key pair indicator), UICC storage capacity is configured for at least two public keys. If one public key is disabled, it could be overwritten by the newly provided public key. By keeping two public keys in storage, a UE could react immediately in case of a failure message, i.e., switch to the other public key.

One public/private key pair may not be sufficient for stable operation (update/expiry/etc.), thus the illustrative embodiments provide a privacy management solution for several key pairs. Given the above-described privacy management embodiments, a wide variety of network configurations can be employed to implement these features. FIGS. 1-7 depict some of these network configurations. However, it is to be appreciated that embodiments are not limited to the network configurations illustrated herein or otherwise described below.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in LTE and 5G networks that provide these main functions. However, other network elements may be used to implement some or all of the main functions represented. Also, it is to be understood that not all functions of an LTE or 5G network are depicted in FIG. 1. Rather, functions that facilitate an explanation of illustrative embodiments are represented. Subsequent figures depict some additional elements/functions.

Accordingly, as shown, communication system 100 comprises user equipment (UE) 102 that communicates via an air interface 103 with an access point (eNB/gNB) 104. The UE 102 may be a mobile station, and such a mobile station may comprise, by way of example, a mobile telephone, a computer, or any other type of communication device. In an LTE-V2X implementation, one or more UEs may be deployed in a given vehicle. The term "user equipment" as used herein is therefore intended to be construed broadly, so as to encompass a variety of different types of mobile stations, subscriber stations or, more generally, communication devices, including examples such as a combination of a data card inserted in a laptop or other equipment (e.g., vehicle). Such communication devices are also intended to encompass devices commonly referred to as access terminals.

In one embodiment, UE 102 is comprised of a UICC and an ME. The UICC is the user-dependent part of the UE and contains at least one Universal Subscriber Identity Module (USIM) and appropriate application software. The USIM securely stores the IMSI number and its related key, which are used to identify and authenticate subscribers to access networks. The ME is the user-independent part of the UE and contains terminal equipment (TE) functions and various mobile termination (MT) functions.

The access point 104 is illustratively part of an access network of the communication system 100. Such an access network may comprise, for example, an E-UTRAN or 5G System (or mixed) having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to a mobility management function 106. In an LTE network, the function is typically implemented by a Mobility Management Element (MME), while in a 5G network the function is implemented by an Access and Mobility Management Function (AMF). Although not expressly shown, a Security Anchor Function (SEAF) can be implemented with the AMF connecting a UE with the mobility management. A mobility management function, as used herein, is the element or function in the core network (CN) part of the communication system that manages, among other network operations, access and authentication operations with the UE (through the access point 104).

The MME/AMF 106 in this illustrative embodiment is operatively coupled to an SLF 107. In illustrative embodiments, SLF 107 is configured to respond to indicators that are sent in messages it receives. As described above, SLF 107 may simply forward the encrypted information to the appropriate home network of UE 102 to have the corresponding HSS/UDM decrypt (or cause to be decrypted by an HSM) the identity (consulting the key pair indicator provided by the UE). Thus, as shown, SLF 107 is operatively coupled to a plurality of HSSs/UDMs 108-1, 108-2, . . . , 108-N. These HSSs/UDMs represent the home networks of UEs that may attach to the communication system 100. SLF 107 is configured to provide the UE information to the appropriate HSS/UDM 108.

The access point 104 is also operatively coupled to a serving gateway function 110 (e.g., Serving Gateway (SGW) in an LTE network, and Session Management Function (SMF) in a 5G network), which is operatively coupled to a Packet Data Network (PDN) Gateway (PGW) 112. PGW 112 is operatively coupled to a Packet Data Network, e.g., Internet 114. MME/AMF 106 and SLF 107 may be considered part of a CN. MME/AMF 106 and SLF 107 can also be part of a serving network. Further typical operations and functions of such network elements are not described here since they are not the focus of the illustrative embodiments and may be found in appropriate 3GPP LTE or 5G documentation.

It is to be appreciated that this particular arrangement of system elements is an example only, and other types and arrangements of additional or alternative elements can be used to implement a communication system in other embodiments. For example, in other embodiments, the system 100 may comprise authentication elements, as well as other elements not expressly shown herein.

Accordingly, the FIG. 1 arrangement is just one example configuration of a wireless cellular system, and numerous alternative configurations of system elements may be used. For example, although only single UE, eNB/gNB, MME/AMF, SLF, SGW/SMF and PGW elements are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of function sets (i.e., function chains) for each corresponding service type using network function virtualization (NFV) on a common physical infrastructure. The network slices are instantiated as needed for a given service, e.g., eMBB service, massive IoT service (e.g., V2X service), and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via eNB/gNB 104.

FIG. 2 shows a block diagram of an overview of a system 200 for providing privacy management in an illustrative embodiment. System 200 is shown comprising privacy management element/function (PM) 202 and network element/function 204. It is to be appreciated that network element/function 204 represents a network element/function that is configured to interact with PM 202 in order to implement privacy management within the communication system of FIG. 1. For example, network element/function 204 may be a User Data Repository (UDR), or some other network element/function that may be used in accordance with the embodiments described herein. In illustrative embodiments, the PM 202 is resident in one or more HNs.

The PM 202 comprises a processor 212 coupled to a memory 216 and interface circuitry 210. The processor 212 of the PM 202 includes a privacy management processing module 214 that may be implemented at least in part in the form of software executed by the processor. The processing module 214 performs privacy management described in conjunction with subsequent figures and otherwise herein. The memory 216 of the PM 202 includes a privacy management storage module 218 that stores data generated or otherwise used during privacy management. The PM 202 further comprises components 220 configured to implement the privacy management. Further details regarding the components 220 will be discussed with reference to FIG. 3.

The network element/function 204 comprises a processor 232 coupled to a memory 236 and interface circuitry 230. The processor 232 of the network element/function 204 includes a privacy management processing module 234 that may be implemented at least in part in the form of software executed by the processor 232. The processing module 234 performs privacy management described in conjunction with subsequent figures and otherwise herein. The memory 236 of the network element/function 204 includes a privacy management storage module 238 that stores a mapping of key pair indicators to public/private key pairs and related data generated or otherwise used during key management and authentication operations.

The processors 212 and 232 of the respective PM 202 and network element/function 204 may comprise, for example, microprocessors, application-specific integrated circuits (ASICs), digital signal processors (DSPs) or other types of processing devices, as well as portions or combinations of such elements.

The memories 216 and 236 of the respective PM 202 and network element/function 204 may be used to store one or more software programs that are executed by the respective processors 212 and 232 to implement at least a portion of the functionality described herein. For example, authentication operations and other functionality as described in conjunction with subsequent figures and otherwise herein may be implemented in a straightforward manner using software code executed by processors 212 and 232.

A given one of the memories 216 or 236 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 236 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 230 of the respective PM 202 and network element/function 204 illustratively comprise transceivers or other communication hardware or firmware that allows the associated system elements to communicate with one another in the manner described herein.

It is apparent from FIG. 2 that PM 202 is configured for communication with network element/function 204 and vice-versa via their respective interface circuitries 210 and 230. This communication involves PM 202 sending data to the network element/function 204, and the network element/function 204 sending data to the PM 202. However, in alternative embodiments, other network elements may be operatively coupled between PM 202 and network element/function 204. The term "data" as used herein is intended to be construed broadly, so as to encompass any type of information that may be sent between user equipment and a core network via a base station element including, but not limited to, identity data, key pairs, key indicators, authentication data, control data, audio, video, multimedia, etc.

It is to be appreciated that the particular arrangement of components shown in FIG. 2 is an example only, and numerous alternative configurations may be used in other embodiments. For example, the user equipment and mobility management function can be configured to incorporate additional or alternative components and to support other communication protocols.

Other system elements, such as eNB/gNB 104, MME/AMF 106, SGW/SMF 110, and PGW 112, may each also be configured to include components such as a processor, memory and network interface. These elements need not be implemented on separate stand-alone processing platforms, but could instead, for example, represent different functional portions of a single common processing platform. Such a processing platform may additionally comprise at least portions of an eNB/gNB and an associated radio network control function.

Privacy management performed by PM 202 comprises performing privacy key pair management, privacy key pair selection, and decryption. Further details regarding the performance of privacy management will be discussed below with reference to FIGS. 3-7.

FIG. 3 illustrates a block diagram of exemplary components of a PM, such as PM 202 from FIG. 2. As shown, PM 300 comprises Privacy Handling Function (PHF) 310, Key Identity Reconfirmation Function (KIRF) 320, Subscription Identifier Decryption Function (SIDF) 330, Key Request Function (KRF) 340 and Key Database (KDB) 350. Although components 310-350 of PM 300 are shown as individual components, the components may be implemented in a single component, or as a combination or sub-combinations of components. In one embodiment, at least a portion of the components of PM 300 are located within an HSM. For example, at least SIDF 330, KRF 340 and KDB 350 may be located in HSM 360, as illustrated by the dashed line surrounding these components in FIG. 3.

In one embodiment, KDB 350 is configured to hold at least a list of tuples comprising a valid (public/private) key identifier PKid and a related private key. Various techniques may be used to provision the KDB 350 with this data. PKid identifies the public key that the UE has used to create a concealed identifier.

PHF 310 is the management function, by which PM 300 interacts with other network functions. In one embodiment, PHF 310 is addressed first and invokes other functions of PM 300. Further, PHF 310 may be required to handle failures or other unexpected use cases, notify the network elements of success/failure, and may have the UE notified if, e.g., PKid is not valid anymore. PHF 310 in some embodiments is responsible for triggering KIRF 320, SIDF 330, and/or other functions that may be added to PM 300.

As mentioned above, PKid identifies the public key, which the UE has used to create the concealed identifier. If PHF 310 receives a concealed identifier and PKid, it triggers KIRF 320, using PKid, to obtain information about the validity of the public/private key pair from a privacy data repository. In one embodiment, the privacy data repository is comprised in a UDR. Based on the PKid, the privacy data repository is configured to check for the validity of the public/private key pair and provide a response back to PHF 310. The response may include additional information. Such additional information may include, for example, information that a new PKid is available, information that the PKid is broken and an update is needed, or information that the PKid is invalid and an update is needed. PHF 310 may be configured to generate error or subscribe/notify messages for the UE in response to the additional information. In the case that the PKid is invalid, a one-time service with the old PKid may be provided. Interface information may be exchanged between PM 300 and the privacy data repository.

KRF 340 is an internal logical function of PM 300 responsible for requesting the private key from KDB 350. Specifically, SIDF 330 is configured to invoke KRF 340 to request the private key from KDB 350 for a particular PKid. KDB 350 finds the private key and sends the private key back to SIDF 330.

If PKid is determined to be valid, PHF 310 is configured to provide PKid and the concealed identifier to SIDF 330 for decryption of the concealed identifier. If decryption is successful, SIDF 330 provides the long-term identifier to PHF 310. In the case of decryption failure, SIDF 330 may provide additional information back to PHF 310, which may result in error messages. PHF 310 is configured to generate the response message for the requesting entity. This message may include the long-term identifier and/or the additional information depending on the data received back from SIDF 330 and KRF 340.

If PHF 310 has a local cache of recently used PKids, PHF 310 may immediately invoke SIDF 330 without invoking the privacy data repository via KIRF 320 beforehand. However, in this case, PHF 310 may, in parallel, trigger KIRF 320 to check the lifetime/validity from the privacy data repository, since the operator may have updated its database after the data was cached.

Before, during or after an Authentication and Key Agreement (AKA) protocol process, PHF 310 may request that KIRF 320 check the validity of PKid with the privacy data repository, and provide KDB 350 with updated information.

In some embodiments, privacy management as described herein is provided as a standalone function, or PMF. In other embodiments, privacy management is provided as a service, or PMS. Embodiments utilizing PMF are discussed in detail below with reference to FIGS. 4 and 5. Embodiments utilizing PMS are discussed in detail below with reference to FIGS. 6 and 7.

Figure 4:
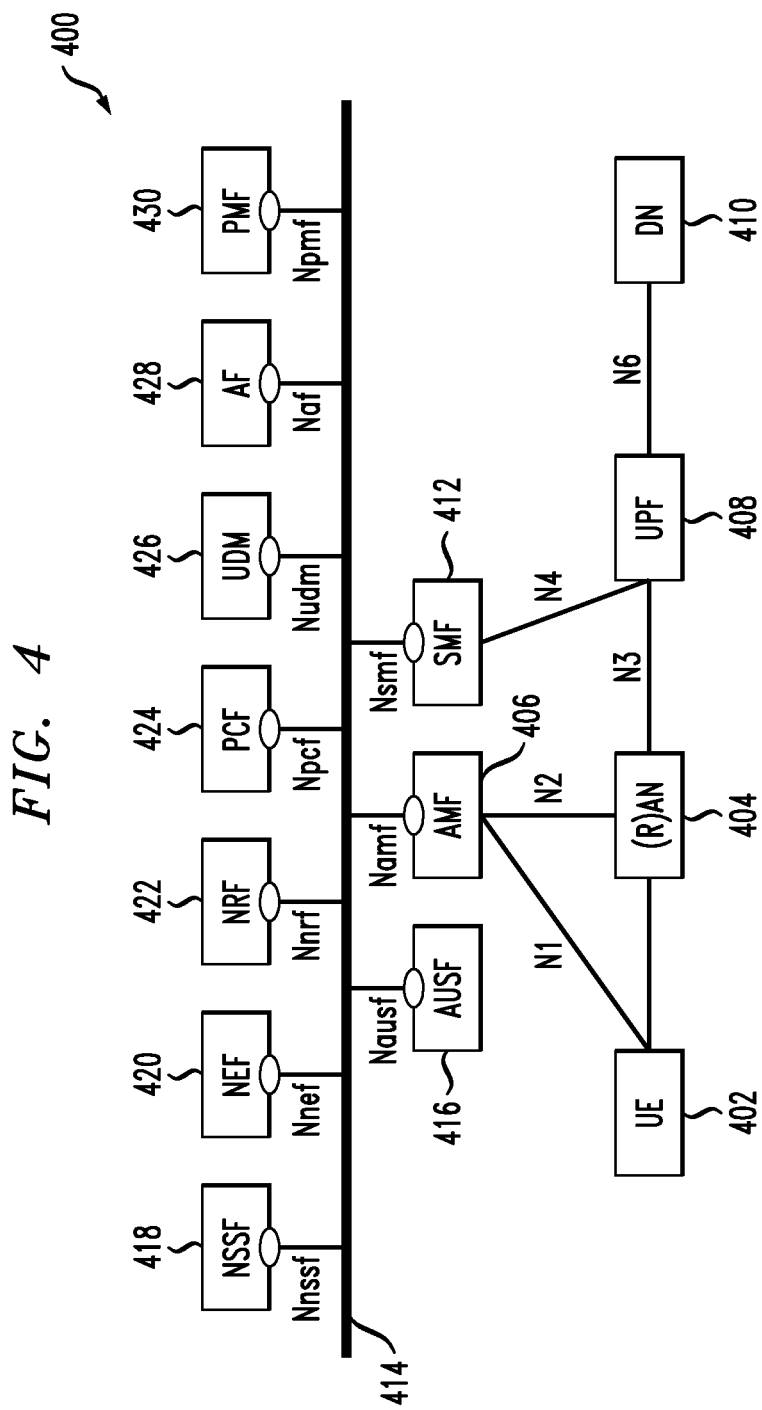
FIG. 4 is a block diagram of a system implementing a privacy management as a function in an illustrative embodiment.

FIG. 4 illustrates a block diagram of an exemplary system 400 implementing privacy management as a standalone function. System 400 is illustratively comprised in a 5G network. System 400 is shown comprising UE 402 in communication with (radio) access network ((R)AN) 404 and AMF 406. (R)AN 404 is in communication with User Plane Function (UPF) 408. UPF 408 is in communication with Data Network (DN) 410 and Session Management Function (SMF) 412.

System 400 further includes interface 414 coupled to AMF 406 and SMF 412. Additionally, AUSF 416, Network Slice Selection Function (NSSF) 418, Network Exposure Function (NEF) 420, Network Function Repository Function (NRF) 422, Policy Control Function (PCF) 424, UDM 426, Application Function (AF) 428, and PMF 430 are coupled to interface 414 as shown.

Each element/function of system 400 is shown having a respective service interface. Since PMF 430 is a standalone function, a new service interface Npmf is needed, which may be invoked directly by other network elements within the environment. Examples of network elements using the service are AUSF 416, UDM 426 and/or NRF 422. PMF 430 is configured to not be accessible outside the home PLMN. Access rights need to be clearly defined for each network element within the home PLMN for which access to PMF 430 is authorized.

Figure 5:
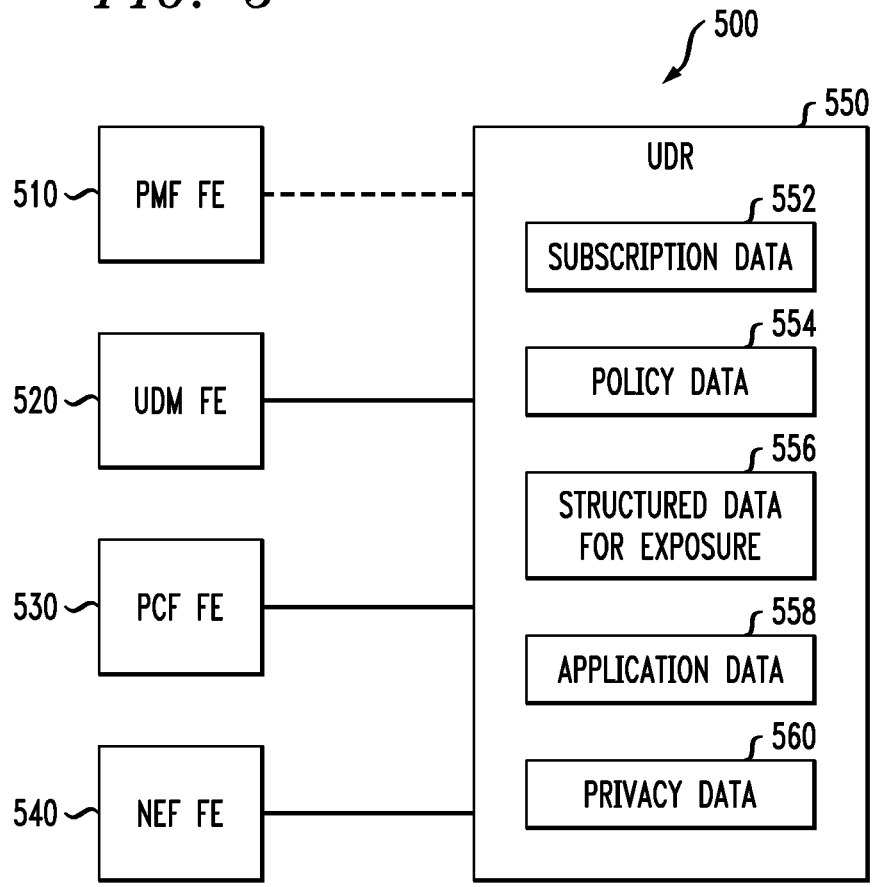
FIG. 5 is a block diagram of a data storage architecture for structured data implementing privacy management as a function in an illustrative embodiment.

FIG. 5 illustrates a block diagram of an exemplary data storage architecture 500 for structured data implementing PMF. As shown, data storage architecture 500 comprises PMF front end (FE) 510, UDM FE 520, PCF FE 530 and NEF FE 540, which are each in communication with UDR 550. UDR 550 is shown comprising subscription data 552, policy data 554, structured data for exposure 556, application data 558 and privacy data 560.

Privacy data 560 may comprise information accessible only by PMF FE 510. For example, privacy data 560 may be accessible by a KIRF component. The KIRF component may be a component of PMF FE 510, or could be a separate service (e.g., a service in UDM FE 520). In one embodiment, PMF FE 510 uses service interface Nudr if information from privacy data 560 is needed (e.g., KIRF of PMF FE 510). Privacy data 560 comprises data sets which may include, for example: (1) a key identifier for the private/public key pair that the home PLMN operator has generated and from which the public key is used by all home PLMN subscribers to encrypt the SUPI (and from the PMF FE 510 to decrypt the resulting concealed identifier); (2) a validity period for the private/public key pair; and (3) management information for private/public key pairs (e.g., active, old, not allowed anymore).

In embodiments illustrated in FIGS. 4 and 5, privacy management is implemented as a standalone network function (PMF). However, as mentioned above, privacy management may be offered as a service (PMS) by another network element/function in a 5G system.

Figure 6:
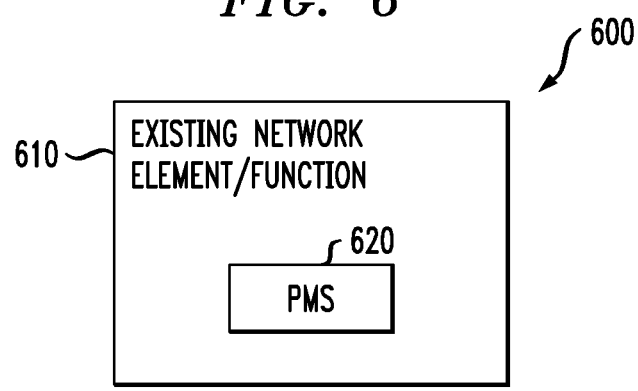
FIG. 6 is a block diagram of implementing privacy management as a service in an illustrative embodiment.

FIG. 6 illustrates a block diagram of a portion of a system 600 implementing PMS. As shown, PMS 620 is co-located within another existing network function 610. That is, existing network function 610 may be considered to be a network function that is enhanced with PMS functionality.

Figure 7:
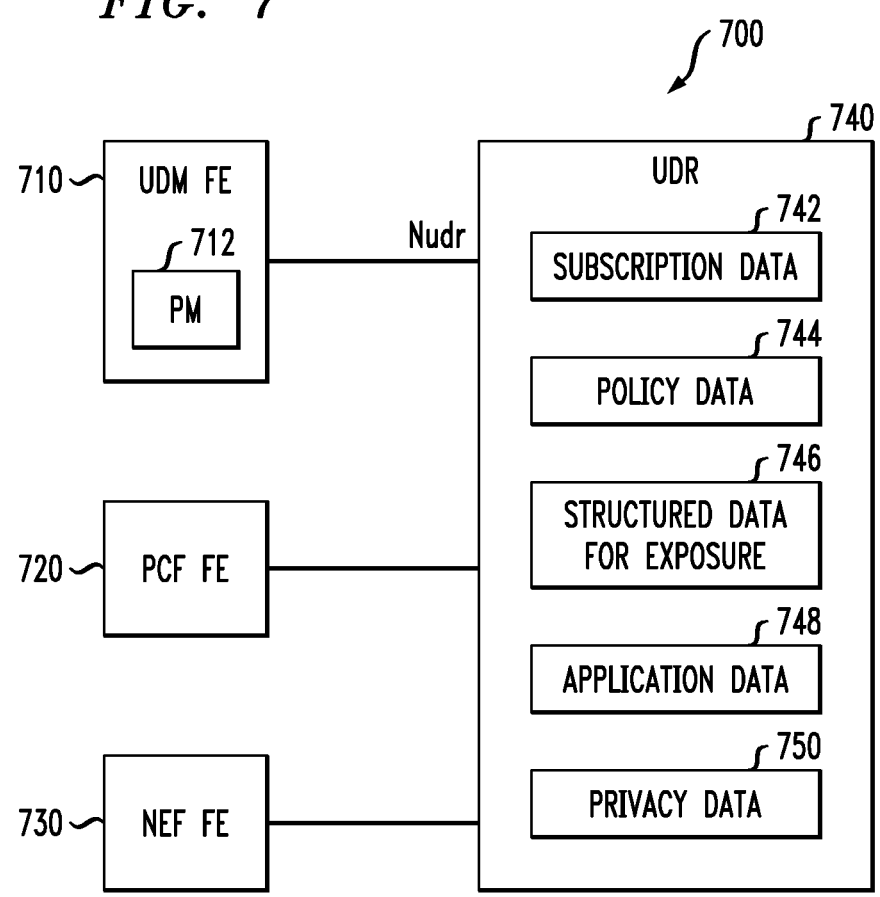
FIG. 7 is a block diagram of a data storage architecture for structured data implementing PMS in an illustrative embodiment.

FIG. 7 illustrates a block diagram of an exemplary data storage architecture 700 for structured data implementing PMS. As shown, data storage architecture 700 comprises UDM FE 710, PCF FE 720 and NEF FE 730, which are each in communication with UDR 740. In this illustrative embodiment, PM 712 is co-located within UDM FE 710 to implement PMS. UDR 740 is shown comprising subscription data 742, policy data 744, structured data for exposure 746, application data 748 and privacy data 750.

It may be particularly advantageous to co-locate the PM with the existing UDM in order to minimize service requests. In this case, privacy management may be addressed by Nudm. If several subscriber databases are used to hold the complete set of all user's subscription identifier information of one home PLMN, NRF may be used to locate the appropriate UDM instance. FIGS. 8 and 9 show tables 800 and 900, respectively, illustrating network function (NF) services that may be provided by a UDM enhanced with PMS.

Optionally, multiple UDM instances may be available in the PLMN serving different SUPI subsets. In this case, the UDM selection for subscriber-data related services (see TS 23.501 for subscriber related UDM) must be done using the SUPI. This selection can be done via an NRF (see TS 23.501). In this case, the SUPI must be available before the first request is sent towards UDM; this is most likely the authentication request (see TS 23.502). Alternatively, in the case of a service architecture, it is also possible that the AMF would request the decryption service from the UDM or NRF from the home network. This way, the AMF could already send the SUPI when starting an AKA protocol request to the home PLMN UDM (possibly via NRF). NRF can then redirect to the UDM instance.

It is to be appreciated that the naming of identifiers mentioned herein, e.g., IMSI, etc., are for illustrative purposes only. That is, an identifier for a UE may have different names or acronyms in different protocols and standards for different communication network technologies. As such, none of the specific names or acronyms given to these identifiers herein are intended to limit embodiments in any manner.

As indicated previously, the embodiments are not limited to the LTE or 5G context and the disclosed techniques can be adapted in a straightforward manner to a wide variety of other communication system contexts including, but not limited to, other 3GPP systems and non-3GPP systems which employ identity (e.g., IMSI or equivalent) in the identity request process.

The processor, memory, controller and other components of a user equipment or base station element of a communication system as disclosed herein may include well-known circuitry suitably modified to implement at least a portion of the identity request functionality described above.

As mentioned above, embodiments may be implemented in the form of articles of manufacture each comprising one or more software programs that are executed by processing circuitry of user equipment, base stations or other elements of a communication system. Conventional aspects of such circuitry are well known to those skilled in the art and therefore will not be described in detail herein. Also, embodiments may be implemented in one or more ASICS, FPGAs or other types of integrated circuit devices, in any combination. Such integrated circuit devices, as well as portions or combinations thereof, are examples of "circuitry" as that term is used herein. A wide variety of other arrangements of hardware and associated software or firmware may be used in implementing the illustrative embodiments.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. A method comprising:
in a home network of a communication system, provisioning one or more cryptographic key pairs for utilization by subscribers of the home network to conceal subscriber identifiers provided to one or more access points in the communication system; and
managing the one or more cryptographic key pairs utilizing an element or function in the home network of the communication system;
wherein managing the one or more cryptographic key pairs utilizing the element or function in the home network of the communication system comprises providing at least one privacy handling interface, the at least one privacy handling interface being configured:
to receive one or more requests related to one or more of the cryptographic key pairs, at least one of the one or more requests comprising at least one cryptographic key pair identifier associated with at least one subscriber of at least one equipment in the communication system;
to utilize the at least one cryptographic key pair identifier to at least one of: determine a validity of at least one cryptographic key pair identified by the at least one cryptographic key pair identifier; request a private key of the at least one cryptographic key pair identified by the at least one cryptographic key pair identifier; and decrypt a concealed identifier utilizing the private key of the at least one cryptographic key pair identified by the at least one cryptographic key pair identifier; and to provide responses to the one or more requests, wherein at least one of the responses to the at least one request comprises information related to one or more updates for one or more cryptographic key pairs that are associated with the at least one subscriber of the at least one user equipment.

2. The method of claim 1, wherein the element or function in the home network of the communication system comprises a standalone function for privacy management.

3. The method of claim 1, wherein the element or function in the home network of the communication system comprises an existing function providing privacy management as a service.

4. The method of claim 3, wherein the existing function comprises a user data management function.

5. The method of claim 1, wherein at least one of the subscriber identifiers comprises a long-term identifier for the at least one subscriber.

6. The method of claim 5, wherein the long-term identifier comprises an International Mobile Subscriber Identifier (IMSI) for the at least one subscriber.

7. The method of claim 1, wherein the at least one privacy handling interface is further configured to invoke one or more additional interfaces provided by the element or function in the home network of the communication system.

8. The method of claim 7, wherein the one or more additional interfaces comprise a key identification reconfirmation interface, the key identification reconfirmation interface being configured:
to identify the at least one cryptographic key pair identifier in the at least one request received at the at least one privacy handling interface;
to check the validity of the at least one cryptographic key pair identified by the at least one cryptographic key pair identifier; and
to generate a response to the at least one privacy handling interface indicating the validity of the at least one cryptographic key pair.

9. The method of claim 8, wherein the response generated by the key identification reconfirmation interface further comprises at least one of:
an indication that a new cryptographic key pair for one or more subscribers of the home network is available;
an indication that the at least one cryptographic key pair is broken and needs to be updated; and
an indication that the at least one cryptographic key pair is not valid and needs to be updated, but that one-time service for use with the at least one cryptographic key pair should be provided.

10. The method of claim 7, wherein the one or more additional interfaces comprise a key request interface, the key request interface being configured to request from a key database a private key of the at least one cryptographic key pair identified by the at least one cryptographic key pair identifier in the at least one request received at the at least one privacy handling interface.

11. The method of claim 7, wherein the one or more additional interfaces comprises a subscription identifier decryption interface, the subscription identifier decryption interface being configured to decrypt a concealed subscriber identifier utilizing a private key of the at least one cryptographic key pair identified by the at least one cryptographic key pair identifier in the at least one request received at the at least one privacy handling interface.

12. An apparatus comprising a processor operatively coupled to a memory and configured to perform the steps of claim 1.

13. An article of manufacture comprising a non-transitory computer-readable storage medium having embodied therein executable program code that when executed by a processor causes the processor to perform the steps of claim 1.

14. A method comprising:
- in user equipment, storing one or more public keys associated with one or more cryptographic key pairs, the one or more cryptographic key pairs being provisioned by a home network of a communication system for use by subscribers of the home network to conceal subscriber identifiers provided to one or more access points in the communication network; and
- interfacing with an element or function of the home network of the communication system for management of the one or more public keys stored in the user equipment;
- wherein interfacing with the element or function of the home network of the communication system comprises:
  - sending one or more requests related to at least one of the one or more cryptographic key pairs to at least one privacy handling interface provided by the element or function in the home network of the communication system, at least one of the one or more requests comprising at least one cryptographic key pair identifier associated with at least one subscriber of the user equipment; and
  - receiving, via the at least one privacy handling interface of the element or function in the home network of the communication system, one or more responses to the one or more requests, at least one of the one or more responses comprising at least one of: a validity of at least one cryptographic key pair identified by the at least one cryptographic key pair identifier; a private key of the at least one cryptographic key pair identified by the at least one cryptographic key pair identifier; and an identifier of the user equipment obtained by decrypting a concealed identifier utilizing the private key of the at least one cryptographic key pair identified by the at least one cryptographic key pair identifier;
- wherein the at least one response further comprises information related to one or more updates for at least one of the one or more cryptographic key pairs that are associated with the at least one subscriber of the user equipment.

15. The method of claim 14, wherein interfacing with the element or function of the home network of the communication system for management of the one or more public keys stored in the user equipment comprises:
- sending one or more requests to the element or function in the home network of the communication to determine the validity of at least one of the public keys stored in the user equipment; and
- receiving from the element or function in the home network of the communication one or more responses indicating the validity of the at least one public key.

16. The method of claim 14, further comprising utilizing at least one of the one or more public keys to conceal at least a portion of a long-term identifier for the at least one subscriber associated with the user equipment.

17. The method of claim 16, wherein the long-term identifier comprises an International Mobile Subscriber Identifier (IMSI), and the concealed portion of the IMSI comprises a Mobile Subscription Identification Number (MSIN) of the IMSI.

18. The method of claim 14, wherein the at least one response further comprises:
- an indication that a new cryptographic key pair for one or more subscribers of the home network is available;
- an indication that the at least one cryptographic key pair is broken and needs to be updated; and
- an indication that the at least one cryptographic key pair is not valid and needs to be updated, but that one-time service for use with the at least one cryptographic key pair should be provided.

19. An apparatus comprising a processor operatively coupled to a memory and configured to perform the steps of claim 14.

20. An article of manufacture comprising a non-transitory computer-readable storage medium having embodied therein executable program code that when executed by a processor causes the processor to perform the steps of claim 14.

* * * * *